United States Patent [19]
Minami

[11] Patent Number: 4,707,648
[45] Date of Patent: Nov. 17, 1987

[54] FOCUS SERVOMECHANISM CONTROL SYSTEM OF OPTICAL DISC SYSTEM HAVING OFFSET SETTING MEANS

[75] Inventor: Akira Minami, Yokohama, Japan
[73] Assignee: Fujitsu Limited, Kawasaki, Japan
[21] Appl. No.: 934,787
[22] Filed: Nov. 25, 1986
[30] Foreign Application Priority Data
Nov. 28, 1985 [JP]   Japan ................................ 60-267679
Mar. 11, 1986 [JP]   Japan ................................ 61-53241
[51] Int. Cl.⁴ .............................................. G05B 1/06
[52] U.S. Cl. ...................................... 318/640; 369/45; 360/77; 318/636
[58] Field of Search .................. 318/640, 636; 360/77, 360/78, 74.6; 369/44, 45; 250/201

[56] References Cited
U.S. PATENT DOCUMENTS
4,346,471  8/1982  Hirasawa .......................... 360/77 X
4,379,256  4/1983  Maury .............................. 318/636 X
4,419,701 12/1983  Harrison et al. ..................... 360/77
4,613,916  9/1986  Johnson .......................... 318/640 X
4,633,453 12/1986  Ogawa .................................. 369/45

Primary Examiner—Benjamin Dobeck
Attorney, Agent, or Firm—Staas & Halsey

[57] ABSTRACT

A focus servomechanism control system in an optical disc is provided for controlling a light focusing unit to adjust a focus of light impinging on a track in a rotatable optical disc. The focus servomechanism control system includes: a unit for moving the light focusing unit in a direction perpendicular to a plane of the optical disc; a unit for producing a focus error signal; a unit for producing a track error signal; and a unit for controlling a position of the light focusing unit through the light focusing unit moving unit in response to the focus error signal and the offset parameter. The focus servomechanism control system further includes an offset setting unit for continuously setting, during an offset adjustment mode, a plurality of offset parameters to the position control unit, to determine a maximum amplitude of the track error signal, and to set the offset parameter producing the maximum amplitude of the track error signal to the position control unit. In a normal operation, the focus servomechanism control system effects varies the focus control in response to the set offset parameter and the focus error signal.

12 Claims, 47 Drawing Figures

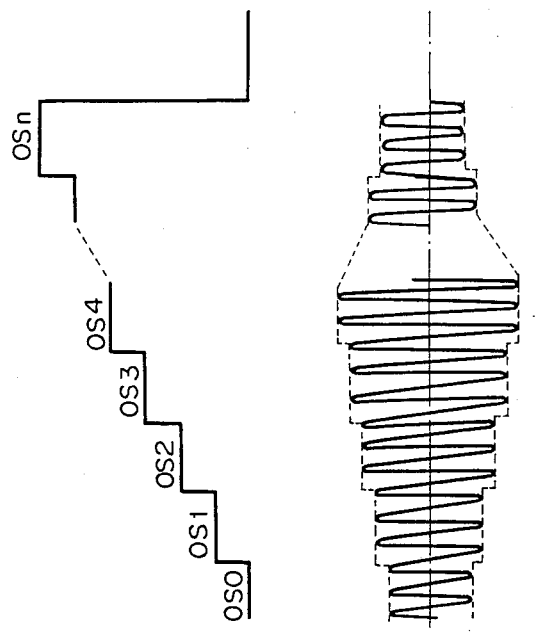

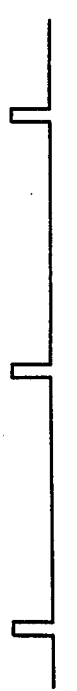
Fig. 16a HOMEPSTN
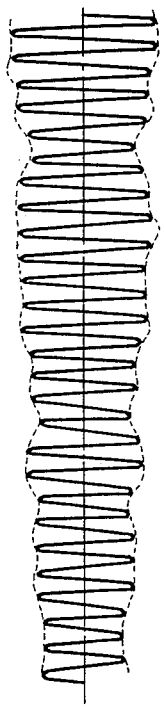
Fig. 16b TES
Fig. 16c PEAK VALUE
Fig. 16d ADCSTART
Fig. 16e ADCEND
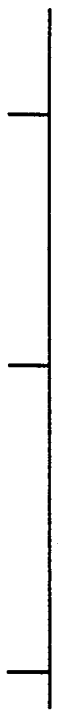
Fig. 16f CLEAR
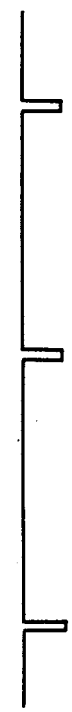
Fig. 16g OFFSET

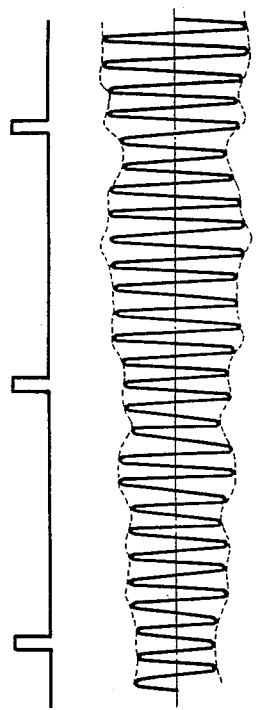
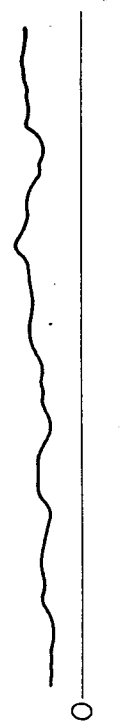
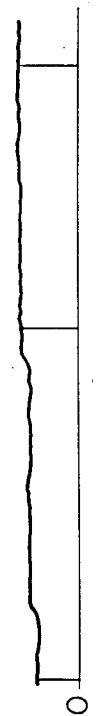
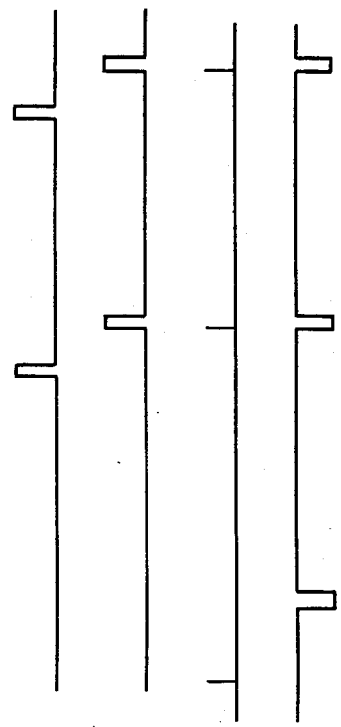
Fig. 20a HOMEPSTN
Fig. 20b TES
Fig. 20c ENVELOPED PEAK (S64a)
Fig. 20d PEAK (S64b)
Fig. 20e ADCSTART
Fig. 20f ADCEND
Fig. 20g CLEAR
Fig. 20h OFFSET

FOCUS SERVOMECHANISM CONTROL SYSTEM OF OPTICAL DISC SYSTEM HAVING OFFSET SETTING MEANS

BACKGROUND OF THE INVENTION

The present invention relates to a focus servomechanism control system for controlling a focus of light beams impinging on a recording film of an optical disc in an optical disc system. More particularly, this invention relates to a focus servomechanism control system having an automatic offset setting means, for automatically determining an optimum offset value, which generates an optimum focus of light beams impinging on the recording film, and setting the determined optimum offset value to a light beam focusing means.

An optical disc system used as a large-capacity external memory device in an information processing system can record at a density more than ten times that of the recording density attainable by a conventional magnetic disc system.

Data recording in the optical disc system is accomplished, for example, by applying strong light beams, i.e., at a write power level, from a laser diode to tracks defined in a recording film on an optical disc to form holes or pits in the tracks in the recording film by thermal reaction. The data thus written in the tracks in the recording film can be read from reflected beams when weak laser beams emitted from the laser diode are applied as optical beams, having a read power level lower than the write power level, to the tracks.

The tracks are defined with a small distance between adjacent tracks, for example, several micron meters, in a radial direction of the optical disc. A track servomechanism control system is provided to precisely control the positioning of an optical head emitting laser beams and receiving the reflected beams with a corresponding track.

In addition, a focus servomechanism control system is provided to precisely control the focusing of laser beams emitted from the optical head onto the tracks to ensure data recording on and data reproduction from the optical disc. In the focus servomechanism control system, offsetting becomes necessary due to, for example, the displacement of a light sensing element and inner circuits in the focus servomechanism. Accordingly, in the focus servomechanism control system, an offset compensation must be provided to improve the accuracy of the data recording and reproduction. When determining whether or not the focusing is at an optimum value, a focus servomechanism signal which is used for controlling the focus is not used because this signal may contain offsets. Instead, a tracking servomechanism signal, more specifically, a tracking error signal, is used for determining the focus. A preformat is recorded in each track, and a light measurement circuit receives the preformat signal, detects a deviation between a light beam axis and the track, and produces the tracking error signal. It is considered that the optimum focus is obtained when the tracking error signal is at a maximum amplitude.

In the prior art, the detection of the optimum focus is performed manually, for example, by changing a variable resistor for a focus offset adjustment, observing the tracking error signal on an oscilloscope, determining a value of the variable resistor which produces the maximum amplitude of the tracking error signal, and finally, locking the variable resistor by using an adherent such as paint.

The prior art offset adjustment suffers from the disadvantages of a low accuracy for the optimum offset value, a low operation efficiency, and a lack of flexibility for readjustment when the offset is varied after an initial offset adjustment has been performed.

SUMMARY OF THE INVENTION

An object of the present invention is to provide a focus servomechanism system for an optical disc system having an automatic offset adjustment means.

Another object of the present invention is to provide a focus servomechanism system for an optical disc system having an automatic offset adjustment means which can adjust an offset level to an optimum offset.

According to the present invention, there is provided a focus servomechanism control system in an optical disc system, including: a rotatable optical disc having at least one track storing data therein; a unit for focusing light for data write and read on the track; and a unit for sensing light reflected from the track and controlling the light focusing unit to adjust the focus of the light on the track.

The focus servomechanism control system includes; a unit, operatively connected to the light focusing unit, for moving the light focusing unit in a direction perpendicular to a plane of the optical disc; a unit, operatively connected to the light sensing unit, for producing a focus error signal; a unit, operatively connected to the light sensing unit, for producing a track error signal; and a unit, operatively connected to the focus error signal producing unit and receiving an offset parameter, for controlling a position of the light focusing unit through the light focusing unit moving unit in response to the focus error signal and the offset parameter. The focus servomechanism control system further includes an offset setting unit, operatively connected to the position control unit and the track error signal producing unit, during an offset adjustment mode, for continuously setting (1) a plurality of offset parameters to the position control unit, in order to determine a maximum amplitude of the track error signal, and (2) the offset parameter producing the maximum amplitude of the track error signal to the position control unit.

The offset setting unit may include; a processor; a largest amplitude detection circuit, operatively connected between the track error signal producing unit and the processor, for detecting a largest amplitude of the track error signal and for sending the largest amplitude to the processor; and an offset outputting circuit, operatively connected between the position control unit and the processor, for outputting the offset parameter from the processor to the position control unit. The processor continuously outputs the plurality of offset parameters, receives the largest amplitude from the amplitude detection circuit for each offset parameter, determines a maximum amplitude from among the received largest amplitudes, and sets the offset parameter producing the maximum amplitude.

The amplitude detection circuit may include a sample holder and an analog-to-digital (A/D) converter connected thereto. The processor outputs a sample hold signal to the sample holder in a period shorter than a frequency of the tracking error signal, to hold the tracking error signal for another short time sufficient for A/D conversion in the sample holder. The A/D converter operates in response to the sample hold signal.

The offset outputting circuit may include a digital-to-analog (D/A) converter outputting an analog signal corresponding to the offset parameter. The offset outputting circuit may also include a plurality of resistors and a plurality of switches selectively shorting the resistors to change a total resistance of the resistors. The processor selectively energizes the switches in response to the offset parameter, and the offset outputting circuit substantially changes a signal used for controlling the position of the light focusing unit in response to the offset parameter and the focus error signal.

The amplitude detection circuit may include a peak holder and an analog-to-digital (A/D) converter connected thereto. The processor energizes the A/D converter before the output of a next offset parameter, receives an A/D converted value in response to the completion of an A/D conversion, and resets the peak holder.

The amplitude detection circuit may also include an envelope detection-type amplitude detection circuit, an integrator for integrating the detected signal at the amplitude detection circuit, and an analog-to-digital (A/D) converter connected to the integrator. The processor energizes the A/D converter before the output of a next offset parameter, receives an A/D converted value in response to the completion of an A/D conversion, and resets the integrator.

The offset setting unit continuously sets the plurality of offset parameters in response to each rotation of the optical disc.

BRIEF DESCRIPTION OF THE DRAWINGS

Other objects and features of the present invention will be described in detail with reference to the accompanying drawings, in which:

FIGS. 9a and 9b are graphs representing wave forms of the focus servomechanism control system shown in FIG. 6;

FIGS. 16a to 16g are timing charts of the focus servomechanism control system of the embodiment illustrated in FIG. 13;

FIGS. 20a to 20h are timing charts of the focus servomechanism control system shown in the embodiment illustrated in FIG. 18.

DETAILED DESCRIPTION OF THE PREFERRED EMBODIMENTS

Before describing the preferred embodiments of the present invention, a basic arrangement of a focus servomechanism control system and a tracking servomechanism control system in an optical disc system and a basic operation thereof will be described with reference to FIGS. 1-5b.

Figure 1:
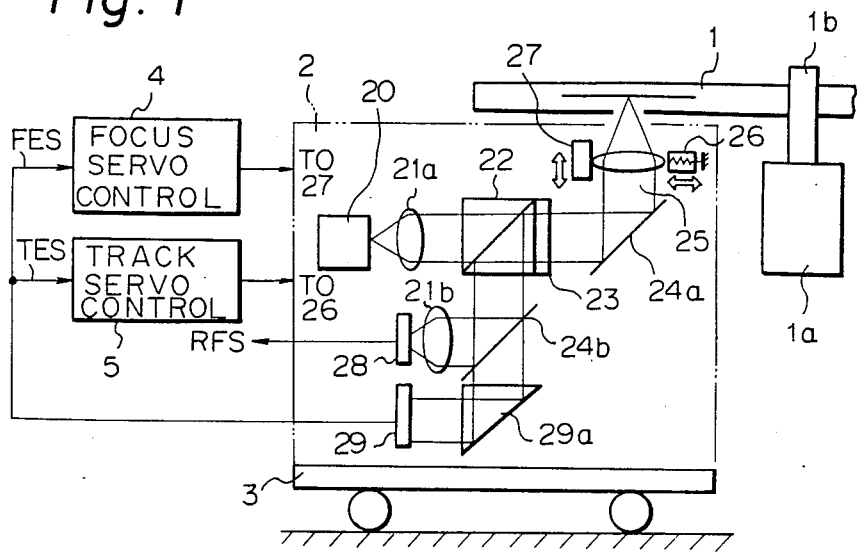
FIG. 1 is a block diagram of an optical disc system including a focus servomechanism control system of the present invention.

Referring to FIG. 1, the optical disc system includes an optical disc 1 having a recording film with a plurality of tracks defined therein, a rotatable shaft 1b, and a rotating mechanism 1a, for example a motor. The rotating mechanism 1a turns at a rated speed to rotate the shaft 1b, resulting in a rotation of the optical disc 1. The optical disc system also includes an optical head 2, a moving mechanism 3 having the optical head 2 mounted thereon, a focus servomechanism control unit 4, and a tracking servo-mechanism control unit 5.

The optical head 2 includes a semiconductor laser 20 as a light source, a collimator lens 21a, a beam splitter 22, a quarter wave plate 23, a mirror 24a, and an objective lens 25.

A first optical system consisting of the above optical elements provides light beams focused onto a track in the optical disc 1, to carry out a data write to and read from the optical disc 1. The optical head 2 also includes a half transparent mirror 24b, a lens 21b, and a first light sensing device 28.

A second optical system, consisting of the lens 25, the mirror 24a, the quarter wave plate 23, the beam splitter 22, the half transparent mirror 24b, the lens 21b, and the light sensing device 28, produces a signal RFS reproducing data stored in the optical disc 1. The optical head 2 further includes a critical-angle prism 29a and a second light sensing device 29.

A third optical system, consisting of the lens 25, the mirror 24a, the quarter wave plate 23, the beam splitter 22, the half transparent mirror 24b, the prism 29a, and the light sensing device 29, provides a tracking error signal TES, which will be used for adjusting an offset, and a focus error signal FES.

The optical head 2 also includes a focus actuator 27 operatively connected to the lens 25 for moving the lens 25 in a direction perpendicular to a plane of the optical disc 1, to change the focusing position of the lens 25 relative to the tracks of the optical disc 1. The optical head 2 further includes a track actuator 26 also operatively connected to the lens 25 for moving the lens 25 in a direction parallel to a plane of the optical disc 1, i.e., in a direction crossing the tracks in the optical disc 1.

Figure 2A:
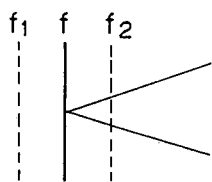
FIGS. 2a to 2e are graphs and views illustrating the detection of the focus condition in the optical disc system in FIG. 1.
Figure 2B:
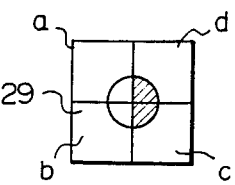
Figure 2C:
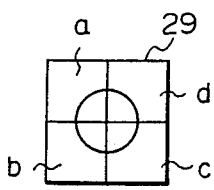
Figure 2D:
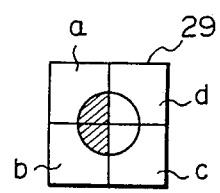
Figure 2E:
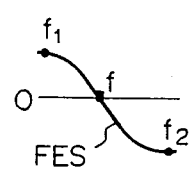

The production of the focus error signal FES will be described with reference to FIGS. 2a to 2e. The light sensing device 29 is divided into four sensing portions a, b, c and d, as shown in FIGS. 2b to 2d. When light beams passing through the lens 25 are focused at an in-focus point f on the track in the optical disc 1, as shown in FIG. 2a, the distribution of the light reflected to the sensing portions a to d is even, as shown in FIG. 2c. When the light beams are focused at a back-focus point $f_1$ on the track, light reflected to the sensing portions c and d is stronger than those at the sensing portions a and b, as shown in FIG. 2b, or conversely, when light beams are focused at point $f_2$ light reflected to the sensing portions a and b is stronger than that at the sensing portions c and d, as shown in FIG. 2d. Under these circumstances, the focus error signal FES as shown in FIG. 2e can be obtained at the focus servomechanism control unit 4 by the following formula:

$$FES = (La + Lb) - (Lc + Ld) \quad (1)$$

where, La to Ld are output signals from the sensing portions a to d of the light sensing device 29.

Accordingly, the focus servomechanism control unit 4 activates the focus actuator 27 in the optical head 2 in response to the focus error signal FES, to focus the light beams from the lens 25 at the in-focus point f on the track.

The generation of the track error signal TES will be described with reference to FIGS. 3a to 3e. Light beams from the lens 25 can be subjected to light interference in response to a point in the track 10. When the light beams are directed onto a center point P in the track 10, the distribution of reflected light received at the sensing portions a to d of the light sensing element 29 is even, as shown in FIG. 3c. When the light beams are shifted leftwards from the center point P directed onto a left side point $P_1$, the reflected light received at the sensing portions b and c is stronger than that received at the sensing portions a and d, as shown in FIG. 3b, or conversely, when light beams are shifted to right side point $P_2$, the reflected light received at the sensing portions a and d is stronger than that received at the sensing portions b and c, as shown in FIG. 3d. A track error signal TES, as shown in FIG. 3e, can be obtained at the tracking servomechanism control unit 5 by the following formula:

$$TES = (La + Ld) - (Lb + Lc) \quad (2)$$

Figure 3A:
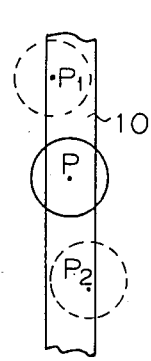
FIGS. 3a to 3e are views illustrating the detection of a tracking error signal in the optical disc system in FIG. 1.
Figure 3B:
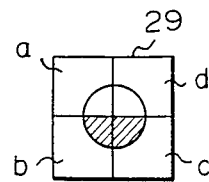
Figure 3C:
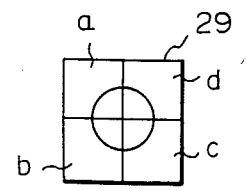
Figure 3D:
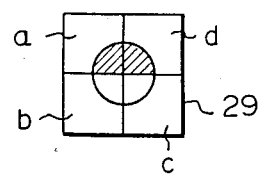
Figure 3E:
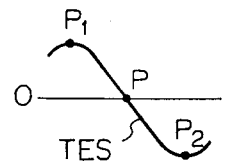

The tracking servomechanism control unit 5 activates the track actuator 26 in the optical head 2 in response to the track error signal TES to move the lens 25 in a horizontal direction so as to direct the light beams onto the center point P in FIG. 3a.

Figure 4A:
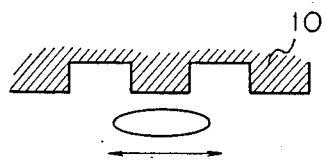
FIGS. 4a, 4b, 5a and 5b are views representing the track error signal formed by the focus servomechanism control system in FIG. 1.
Figure 4B:
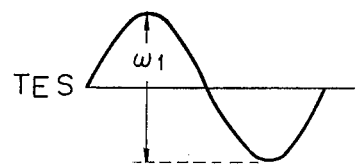
Figure 5A:
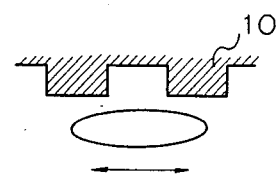
Figure 5B:
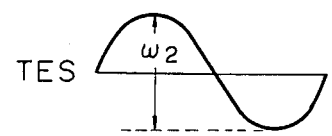

Referring to FIGS. 4a, 4b, 5a and 5b, when the light beams from the lens 25 are focused at the in-focus point f on the track 10, as shown in FIG. 4a, an amplitude $w_1$ of the track error signal TES in FIG. 4b is higher than an amplitude $w_2$ in FIG. 5b when the light beams from the lens 25 are shifted as shown in FIG. 5a.

Accordingly, an optimum offset value can be determined by detecting a maximum amplitude of the track error signal TES.

A focus servomechanism control system of a first embodiment of the present invention will be described with reference to FIGS. 6 to 11.

Figure 6:
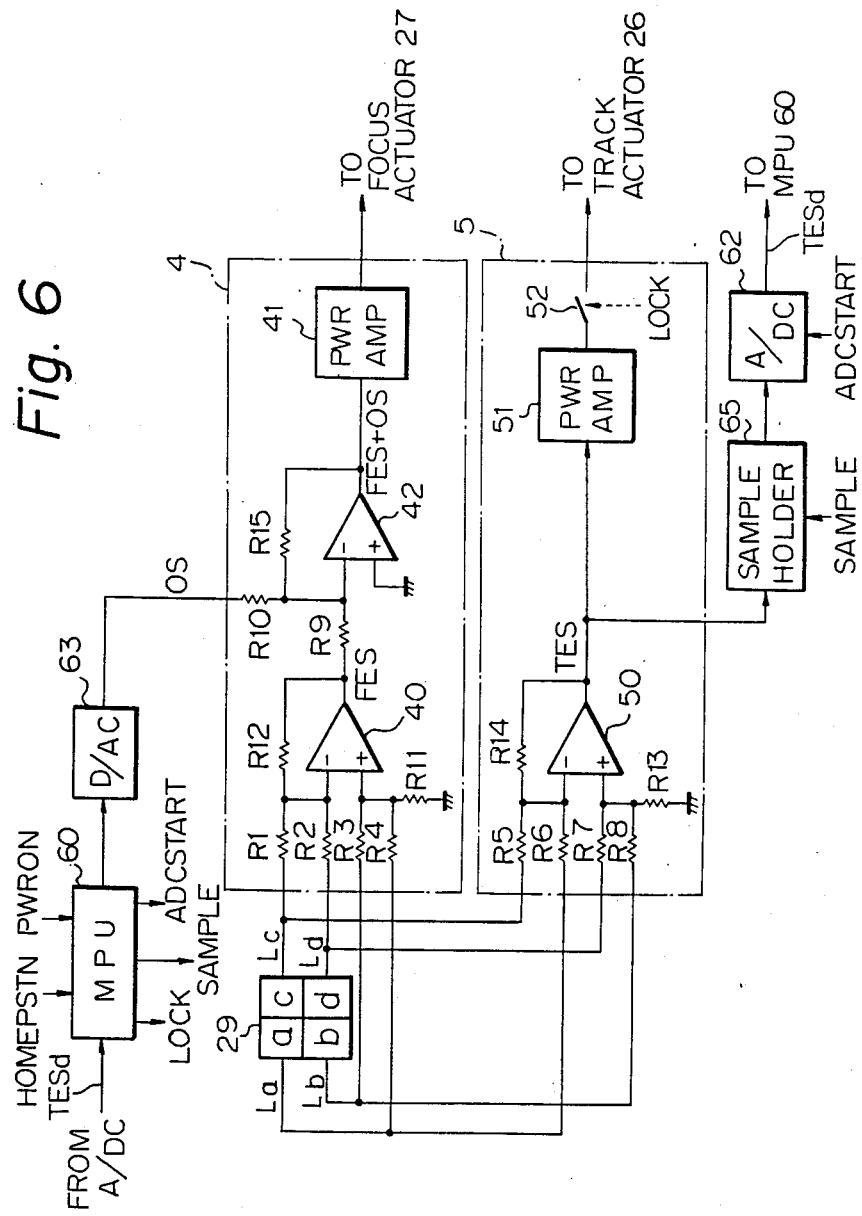
FIG. 6 is a circuit diagram of a focus servomechanism control system of an embodiment in accordance with the present invention.

Referring to FIG. 6, a focus servomechanism control unit 4 includes: input resistors R1 to R4 receiving electrical signals La to Ld from the sensing portions a to d of the light sensing element 29; an operational amplifier 40 functioning as a subtracting circuit for producing the focus error signal FES in accordance with the formula (1); and an operational amplifier 42 functioning as an adder for adding an offset value OS, described later, to the focus error signal FES. The added focus error signal FES amplified at a power amplifier 41, and the amplified signal is then supplied to the focus actuator 27 in the optical head 2 in FIG. 1. In FIG. 6, references R9, R10, R11, R12, and R15 represent resistors. A tracking servomechanism control unit 5 includes: input resistors R5 to R8 receiving the electrical signals La to Ld; an operational amplifier 50 functioning as a subtracting circuit for producing the track error signal TES in accordance with the formula (2); a power amplifier 51, a switch 52, and resistors R13 and R14. An amplified signal at the power amplifier 51 is supplied to the track actuator 26 in the optical head 2 in FIG. 1 through the switch 52.

Figure 7:
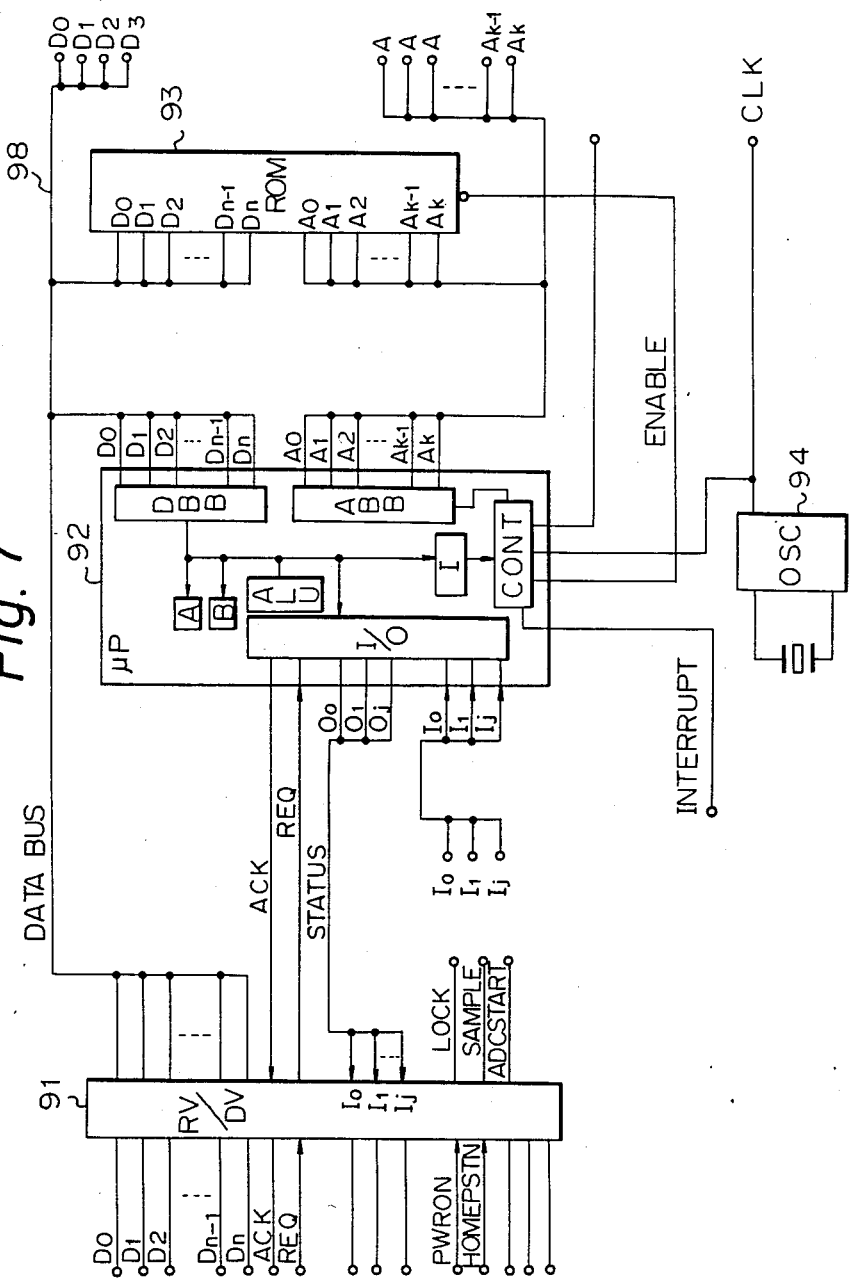
FIG. 7 is a circuit diagram of a microprocessor unit utilized by the present invention and shown in FIG. 6.

The focus servomechanism control system further includes an offset adjustment block including a microprocessor unit (MPU) 60, a digital-to-analog (D/A) converter 63, a sample holder 65, and an analog-to-digital (A/D) converter 62 in addition to the above servomechanism control units 4 and 5. The MPU 60, per se, has a conventional structure as shown in FIG. 7. The MPU 60 includes, for example, a data bus buffer DBB, an address bus buffer ABB, an A register, a B register, an arithmetic and logic unit ALU, an instruction register I, an input/output I/O interface, a register 91, data bus 98 and a control circuit CONT. The actual microprocessor 92 used may be, for example, an Intel 8031. The ROM 93 stores a plurality of offset data for determining a maximum offset value and programs for the following operation. The oscillator 94 generates a clock signal CLK which is applied to the control circuit CONT in the microprocessor 92. The MPU 60 outputs a lock signal LOCK to the switch 52 in the tracking servomechanism control unit 5 to substantially deenergize the tracking servomechanism control during the offset adjustment operation. The MPU 60 sequentially outputs the offset data to the D/A converter 63 to determine the maximum offset value. The D/A converter 63 produces the offset value OS in accordance with commands and data from the MPU 60. The MPU 60 periodically outputs a sampling signal SAMPLE to the sample holder 65, to hold the track error signal TES for a short time to stabilize the A/D conversion data. The sample holder 65 holds the track error signal TES from the amplifier 50, and the A/D converter 62 converts data held at the sample holder 65 into a digital value. The digital-converted track error signal TESd is input to the MPU 60.

The operation of the focus servomechanism control system will be described with reference to FIGS. 8a, 8b, 9a, 9b, 10, and 11.

Steps 001 to 003 (S001 to S003)

When power is supplied to the MPU 60 and a power ON signal PWRON is received at the MPU 60, the MPU 60 starts an offset adjustment operation. Namely, at step 001, the MPU 60 outputs a lock signal LOCK to the switch 52 in the tracking servomechanism control unit 5 to substantially deenergize the tracking servomechanism control. Then, at step 002, the MPU 60 turns ON the focus servomechanism control unit 4, and at step 003, the MPU 60 clears a maximum peak value stored therein.

Step 004 (S004)

At step 004, the MPU 60 waits until a home position signal HOMEPSTN is input therein. This home position signal HOMEPSTN is output from an optical disc mechanism at each rotation of the optical disc 1. The MPU 60 then updates the offset value in response to the home position signal HOMEPSTN.

Steps 005 and 006 (S005, S006)

Upon receipt of the home position signal HOMEPSTN, at step 005, the MPU 60 clears a peak data stored therein. Then, at step 006, the MPU 60 outputs a first offset data $OS_0$, which may be zero, stored in the ROM 93 and shown in FIG. 9a, to the D/A converter 63. The D/A converter 63 provides an offset value of the analog value, i.e., a voltage signal, to the amplifier 42 in the focus servomechanism control unit 4 through the resistor R10. The amplifier 42 adds the offset value OS to the focus error signal FES, and the focus actuator 27 moves the lens 25 in response to the added FES and OS control signal. The track error signal TES for the offset value OS can be produced from the amplifier 50 in the tracking servomechanism control unit 5, as shown in FIG. 9b.

Steps 007 to 012 (S007 to S012)

At step 007, the MPU 60 outputs a sampling signal SAMPLE to the sample holder 65, and starts the A/D converter 62. The sample signal SAMPLE can be periodically output in a period shorter than a period of the tracking error signal and sufficiently short to detect a peak value of the tracking signal. A sample held track error data from the amplifier 50 can be converted into a digital track error signal TESd at the A/D converter 62. At step 008, the MPU 60 reads the track error signal TESd, and at step 009, the MPU 60 compares the current track error signal TESd and the peak data. When the current track error signal TESd is greater than the peak data, i.e., YES at step 009, then at step 010, the MPU 60 updates the peak data to the current track error signal TESd, and at step 011, saves the current offset value. If the result at step 009 is NO, the MPU 60 by-passes steps 010 and 011.

Figure 10:
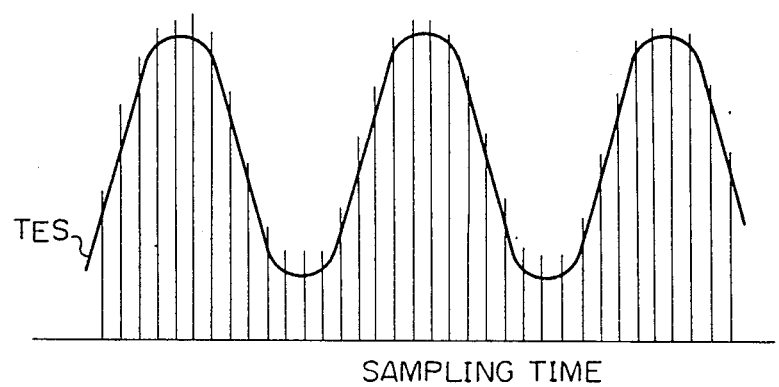
FIG. 10 is a graph of an enlarged tracking error signal as shown in FIG. 9b.

The above operations can be repeatedly performed in a short period defined by the speed of the MPU 60 and the A/D converter 62, as shown in FIG. 10. FIG. 10 is an enlarged wave form graph of the track error signal TES in FIG. 9b. The track error signal TES oscillates at a frequency defined by the rotation of the optical disc 1. A plurality of bars represent timings of the sampling and the A/D conversion. Throughout the above operation, a maximum peak value of the track error signal TES can be detected for one offset value OS.

Steps 012 to 015 (S012 to S015)

When a next home position signal HOMEPSTN is supplied to the MPU 60, at step 013 the MPU 60 compares the maximum peak value therein and a new maximum peak value obtained through the above operations of steps S007 to S012. When the new maximum peak value is greater than the previous maximum peak value, at step 013, then at step 014, the MPU 60 updates the maximum peak value to the new maximum peak value, and at step 015, saves the offset value producing the new maximum peak value. If the result is NO at step 013, the updating operation is by-passed by the MPU 60.

Steps 016 and 017 (S016 and S017)

If, at step 016, the output for all offset data shown in FIG. 9a is not yet completed, then at step 017, the MPU 60 updates the offset data to the next value stored in the ROM 93 and repeats the operations from step 005.

Steps 016 and 018 (S016 and S018)

Figure 11:
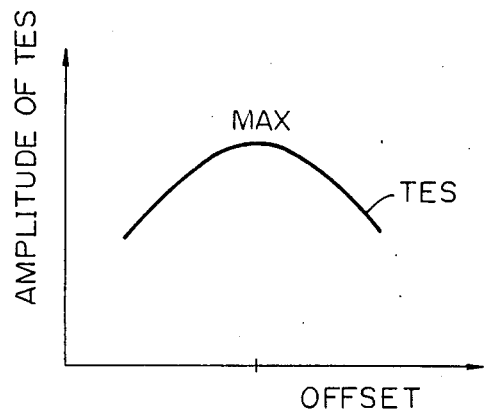
FIG. 11 is an enlarged waveform graph representing a maximum amplitude of the tracking error signal as a function of offset.

When, at step 016, the output for all offset data is completed, the maximum peak value stored in the MPU 60 indicates a maximum amplitude of the track error signal TES from among a plurality of maximum amplitudes of the track error signals TES obtained for the plurality of offset values as shown in FIG. 11. The maximum amplitude is regarded as an optimum offset value. Then, at step 018, the MPU 60 sets the offset value producing the maximum amplitude to the D/A converter 63 as an optimum offset value, to focus the light beams at the in-focus point f on the track of the optical disc 1.

The MPU 60 then releases the lock on the tracking servomechanism control by outputting an ON state lock signal LOCK, and thus terminates the offset adjustment operation.

The optimum offset value is automatically determined from the above operation. In a normal operation, the focus servomechanism control is varied in response to the offset value OS, having a constant value obtained by the above operation, and the focus error signal FES produced at the amplifier 40.

Another embodiment of the automatic focus servomechanism control system will be described with reference to FIG. 12.

Figure 12:
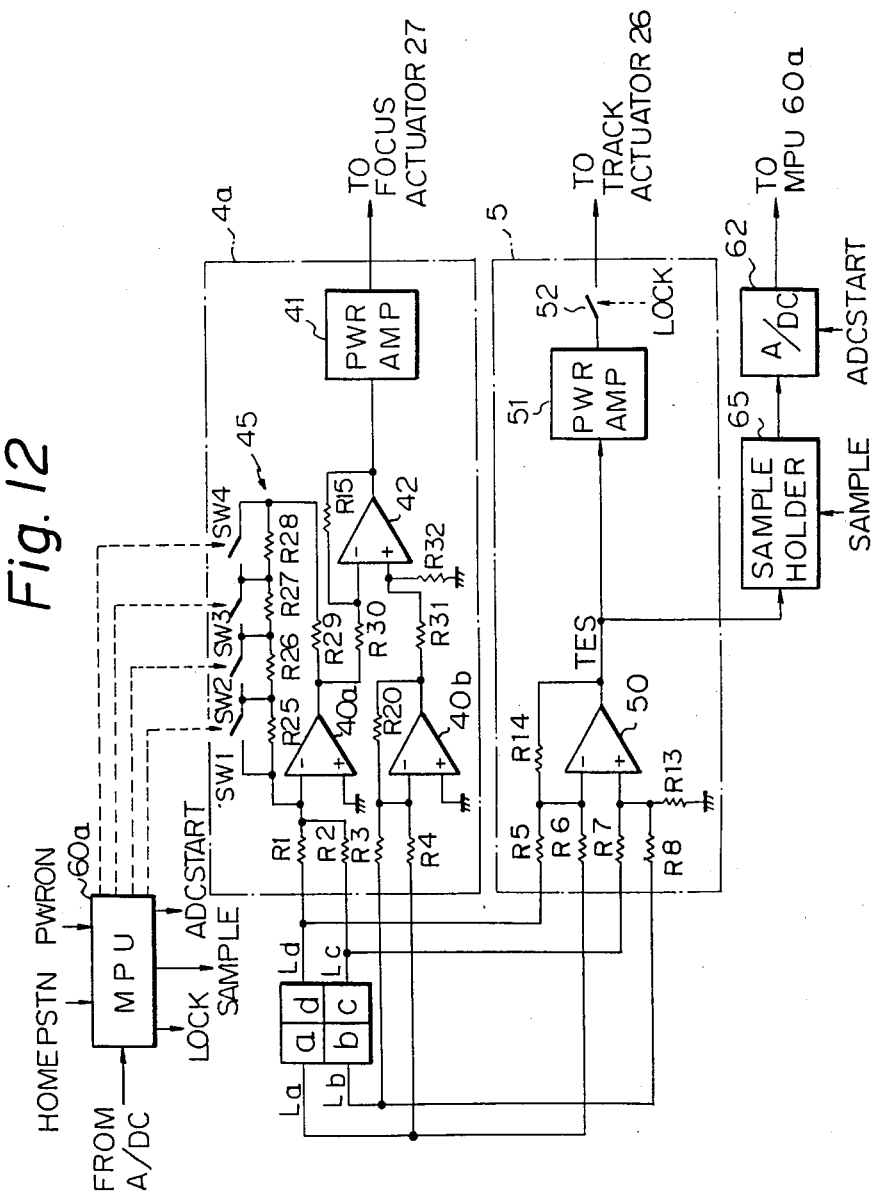
FIG. 12 is a circuit diagram of a focus servomechanism control system of another embodiment in accordance with the present invention.

Referring to FIG. 12, the D/A converter 63 in FIG. 6 is omitted, and an offset setting circuit 45 consisting of series-connected resistors R25 to R28 and switches SW1 to SW4 is provided within the focus servomechanism control unit 4a. The resistance values of the series-connected resistors R25 to R28 are assigned by, for example, 1, 2, 4, 8, and a resistance value of the series-connected resistors R25 to R28 is varied between zero and 15 by changing the status of the switches SW1 to SW4. The series-connected resistors R25 to R28 act as a feedback resistor for an amplifier 40a together with a resistor R29, and the amplifier 40a first calculates the following formula:

$$\alpha(Lc+Ld)$$

where, $\alpha$ is an amplification factor defined by the offset setting circuit 45. On the other hand, an amplifier 40b produces a signal $(La+Lb)$, and the amplifier 42 calculates a value $\alpha(Lc+Ld)-(La+Lb)$. The calculated value is substantially equal to the value (FES+OS) output from the amplifier 42 in FIG. 6.

Still another embodiment of the focus servomechanism control system of the present invention will be described with reference to FIG. 13.

Figure 13:
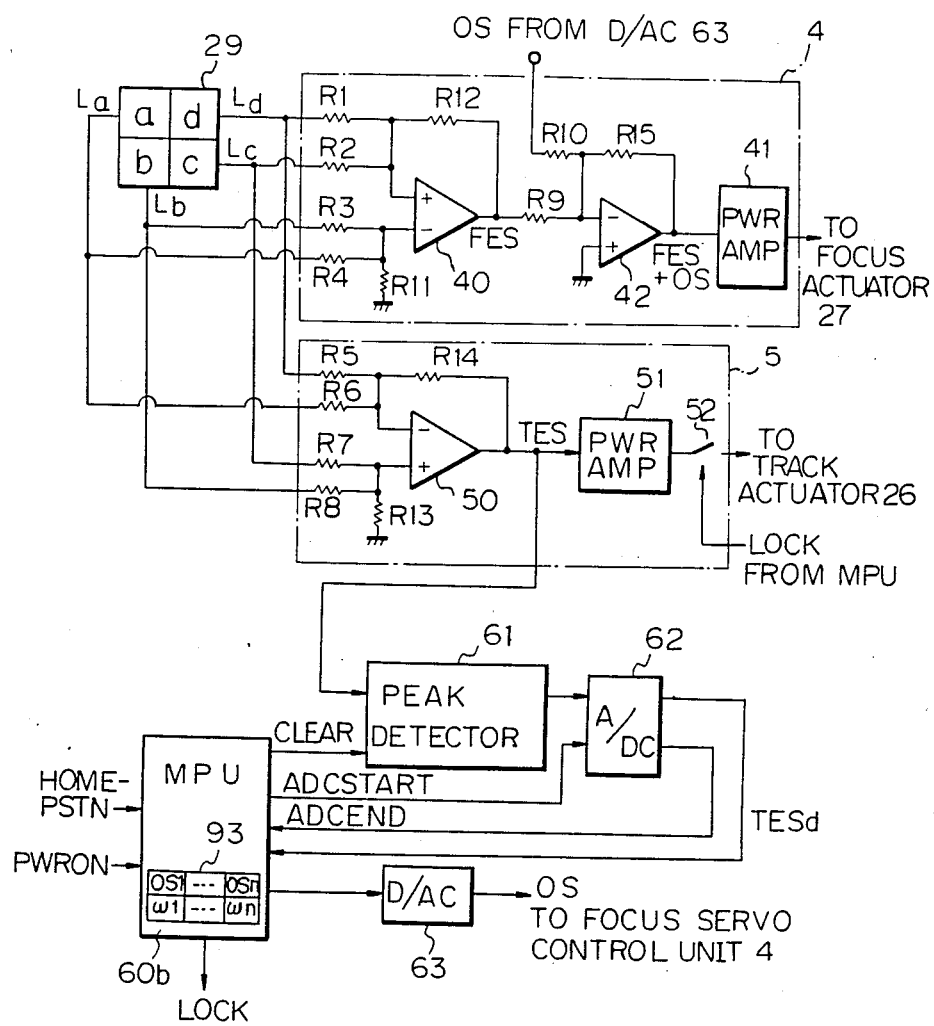
FIG. 13 is a circuit diagram of a focus servomechanism control system of still another embodiment in accordance with the present invention.

Referring to FIG. 13, an offset adjustment system includes a peak detector 61 instead of the sample holder 65 shown in FIGS. 6 and 12. Other circuits shown in FIG. 13 are substantially identical to those in FIG. 6.

Figure 14A:
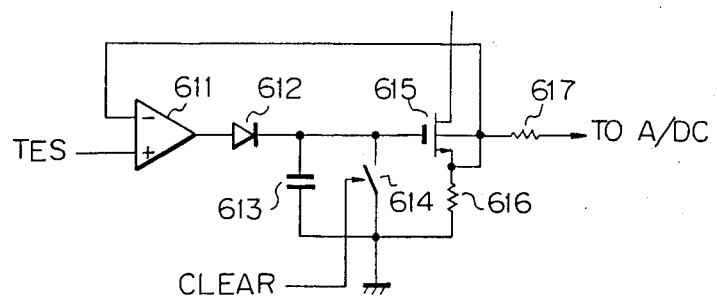
FIGS. 14a and 14b are circuit diagrams of a peak used in the embodiment of the present invention shown in FIG. 13.
Figure 14B:
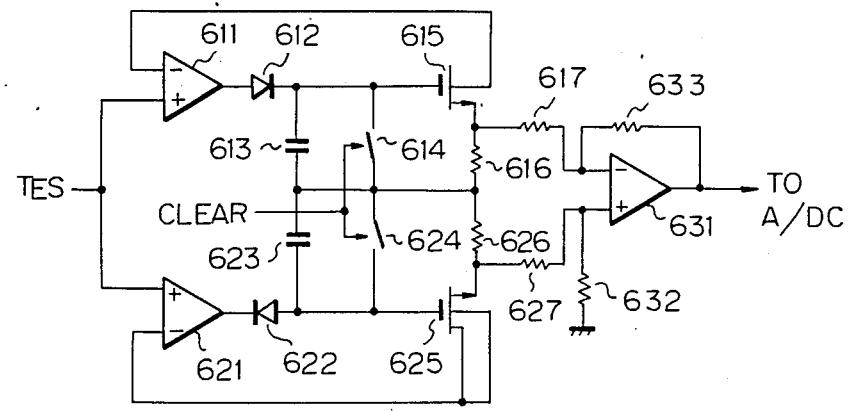

The peak detector 61 may be a conventional peak detector, as shown in FIGS. 14a and 14b. The peak detector shown in FIG. 14a includes an amplifier 611, a diode 612, a capacitor 613, a reset switch 614, a transistor 615, and resistors 616 and 617. The peak detector detects a peak having a positive polarity. The peak detector holds that peak and clears the held peak when supplied a clear signal CLEAR from the MPU 60b. The peak detector shown in FIG. 14b includes a positive peak detection circuit including the elements 611 to 617 and having a same circuit construction as shown in FIG. 14a, a negative peak detection circuit including the elements 621 to 627, corresponding to elements 611–617, respectively and a subtraction circuit including an amplifier 631 and resistors 632 and 633. The peak detector shown in FIG. 14b provides a peak-to-peak value.

Figure 15:
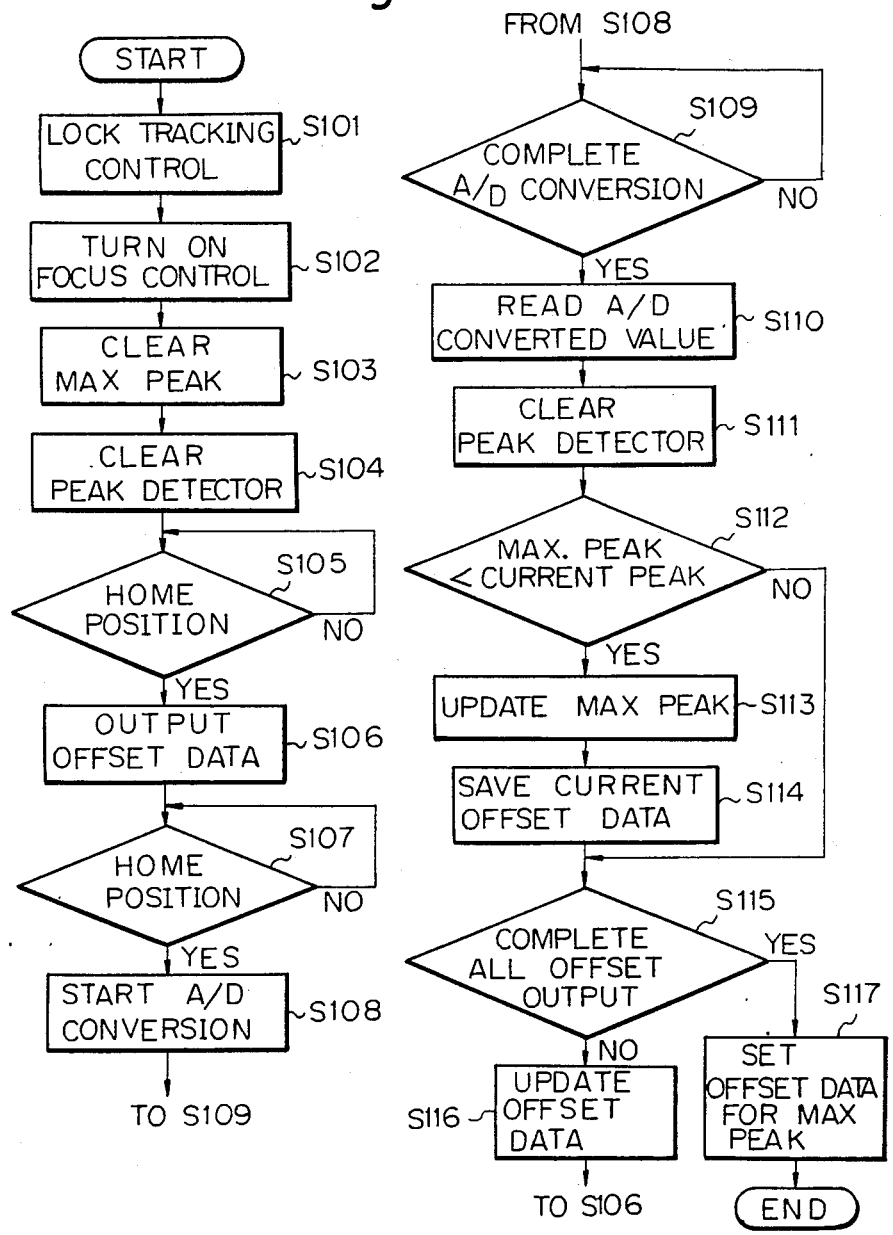
FIG. 15 is a flow chart indicating the operation of the focus servomechanism control system in the embodiment of the present invention shown in FIG. 13.

The operation of the focus servomechanism control system 4 shown in FIG. 13 will be described with reference to FIG. 15, and 16a to 16g. FIG. 15 is a flow chart, and FIGS. 16a to 16g are timing charts.

The basic principle of the operation of the focus servomechanism control system in FIG. 13 is similar to that of the system in FIG. 6.

Steps 101 to 104 (S101 to S104)

Figure 8A:
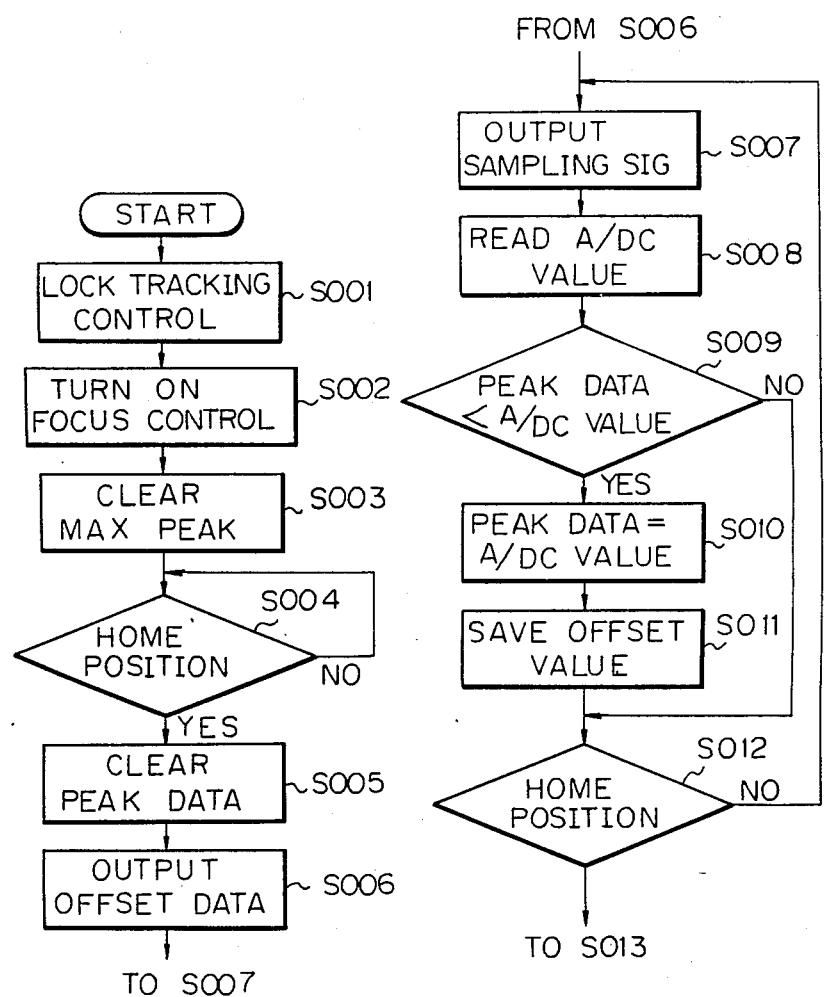
FIGS. 8a and 8b are flow charts representing the operation of the focus servomechanism control system shown in FIG. 6.

Steps S101 to S103 in FIG. 15a are substantially equal to steps S001 to S003 in FIG. 8a, and thus a description thereof is omitted. At step 104, the MPU 60b outputs a clear signal CLEAR to the peak detector 61, to reset the peak value held therein.

Steps 105 and 106 (S105 and S106)

Upon receipt of the home position signal HOMEPSTN (FIG. 16a) at step 105, the MPU 60b outputs a first offset value stored in the ROM 93 through the D/A converter 63 to the focus servomechanism control unit 4 (FIG. 16g) at step 106.

Step 107 (S107)

At step 107, the MPU 60b waits until the home position signal HOMEPSTN is supplied. During the wait, the peak detector 61 detects the peak of the tracking error signal TES, as shown in FIG. 16b, and updates a maximum peak for the offset value (FIG. 16c).

Steps 108 to 111 (S108 to S111)

Upon receipt of the home position signal HOMEPSTN at step 107, the MPU 60b outputs an A/D conversion start signal ADCSTART to the A/D converter 62 to start the A/D conversion for the peak data (FIG. 16d) at step 108. Upon completion of the A/D conversion at step 109, the A/D converter 62 sends an A/D conversion end signal ADCEND to the MPU 60b (FIG. 16e) at step 110, the MPU 60b reads an A/D converted peak value TESd, and then at step 111, clears the peak detector 61 (FIG. 16F).

Steps 112 to 117 (S112 to S117)

Figure 8B:
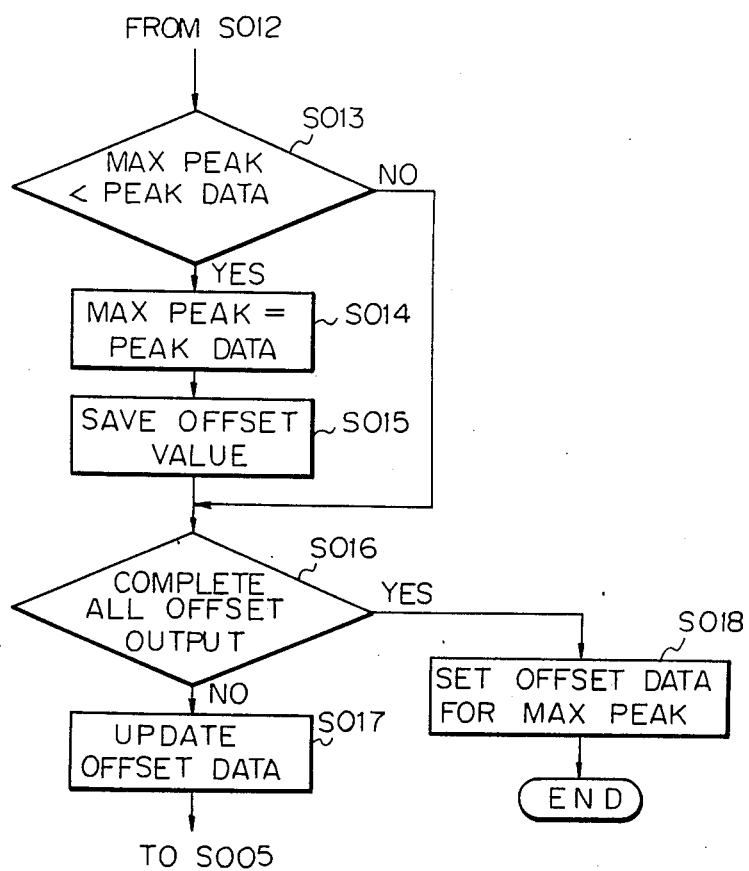

The operations at steps S112 to S117 are substantially the same as those of steps S013 to S018 shown in FIG. 8b, and thus a description thereof is omitted.

Compared with the focus servomechanism control system shown in FIG. 6, the load at the MPU 60b is greatly reduced, because the high speed sampling control between steps S007 and S012 in FIG. 8a is removed. Therefore, in the focus servomechanism control system shown in FIG. 13, an A/D converter 62 with a low A/D conversion time can be used. In particular, by introducing the peak detector 61, the peak-detection accuracy can be improved.

Yet another embodiment of the focus servomechanism control system of the present invention will be described with reference to FIG. 17.

Figure 17:
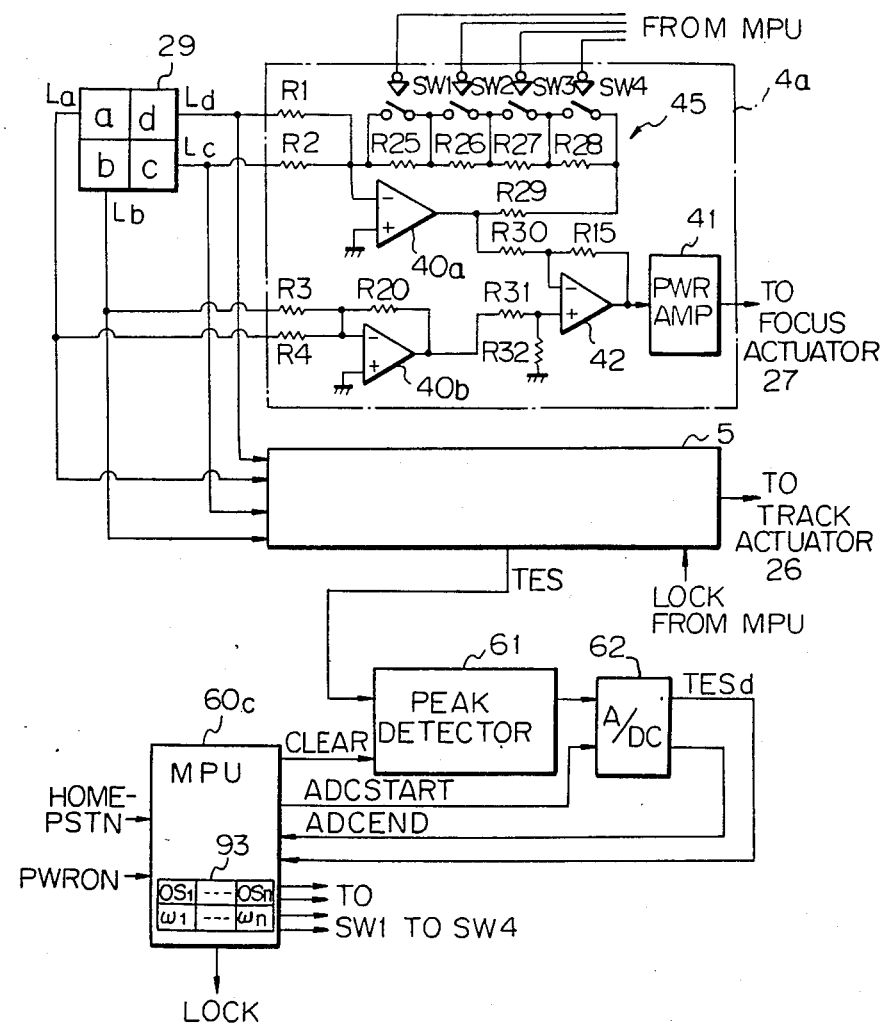
FIG. 17 is a circuit diagram of a focus servomechanism control system of yet another embodiment in accordance with the present invention.

The focus servomechanism control system in FIG. 17 is combined with the focus servomechanism control system shown in FIG. 13 and the focus servomechanism control system shown in FIG. 12. That is, the D/A converter 63 in FIG. 13 is omitted, and the focus servomechanism control unit 4a has the same arrangement as that of FIG. 12. A detailed circuit of the tracking servomechanism control unit 5 is not illustrated, but has a same arrangement as that of FIG. 13. Accordingly, a description of the operation of the focus servomechanism control system in FIG. 17 is omitted.

Another embodiment of the present invention will be described with reference to FIG. 18.

Figure 18:
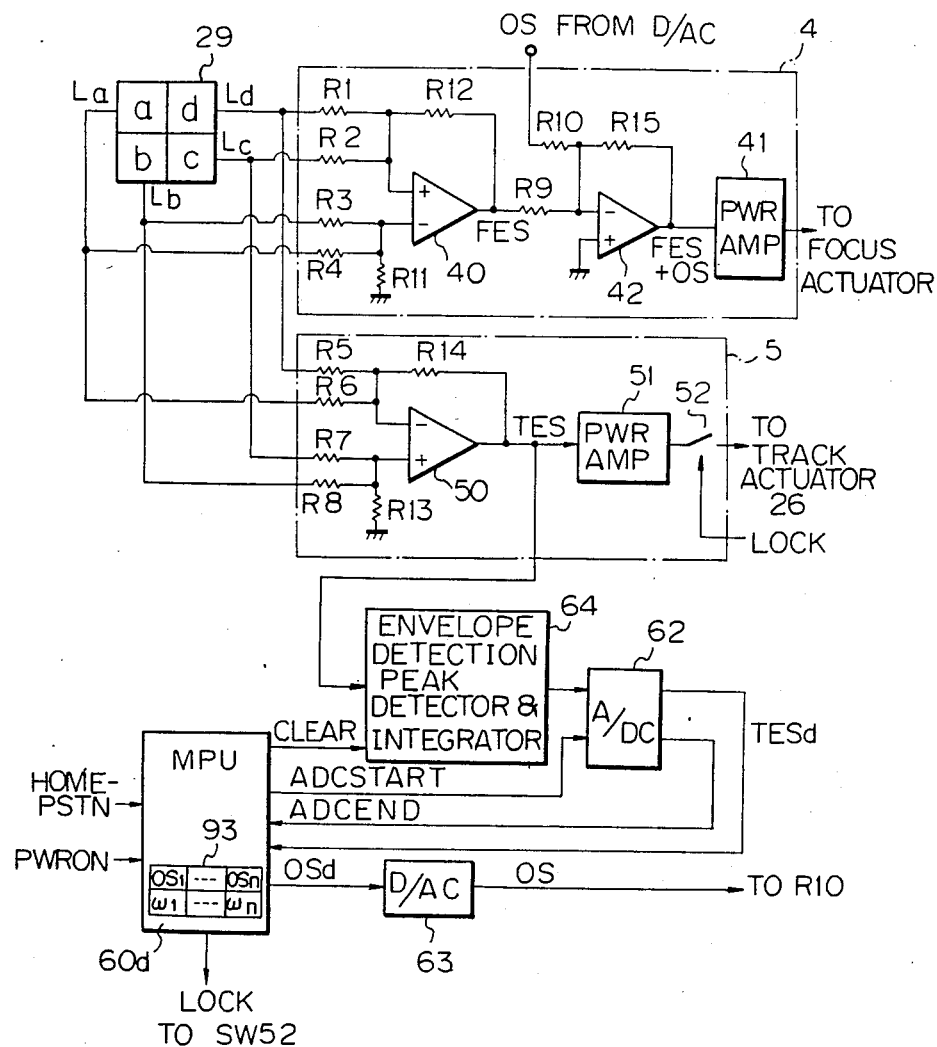
FIG. 18 is also a circuit diagram of a focus servomechanism control system of an embodiment in accordance with the present invention.
Figure 19:
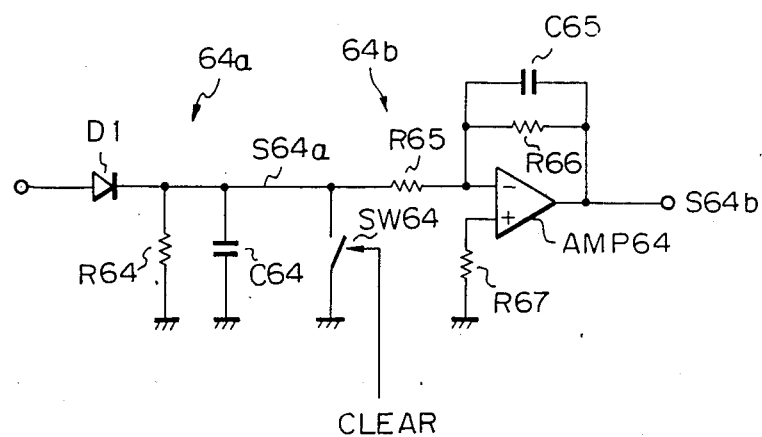
FIG. 19 is a circuit diagram of an envelope detection-type peak detector and integrator of the embodiment of the present invention shown in FIG. 18.

The focus servomechanism control system shown in FIG. 18 has an arrangement similar to that of FIG. 13, except that an envelope detection type peak detector and integrator 64 is provided instead of the peak detector 61 in FIG. 13. The envelope detection type peak detection and integrator 64 can be used as a conventional circuit as shown in FIG. 19. The envelope detection type peak detection and integrator 64 indicates enveloped peak S64a and peak S64b and includes an envelope detection peak circuit 64a having a diode D1; a resistor R64 and a capacitor C64; and an integrator circuit 64b consisting of an amplifier AMP64, resistors R65, R66 and R67, a capacitor C65, and a reset switch SW64.

As shown in FIG. 20b, the tracking error signal TES oscillates at a high frequency defined by the rotation speed of the optical disk 1, and accordingly, the envelope detection peak circuit 64 accurately detects a peak value of the enveloped tracking error signal TES, as shown by a dotted line (FIG. 20c). The detected peak value is stably held at the integrator circuit 64b during the A/D conversion. As a result, the accuracy of the A/D converted peak value is improved because any change of the peak value held in the integrator circuit 64b can be substantially neglected.

A further embodiment of the present invention will be described with reference to FIG. 21.

Figure 21:
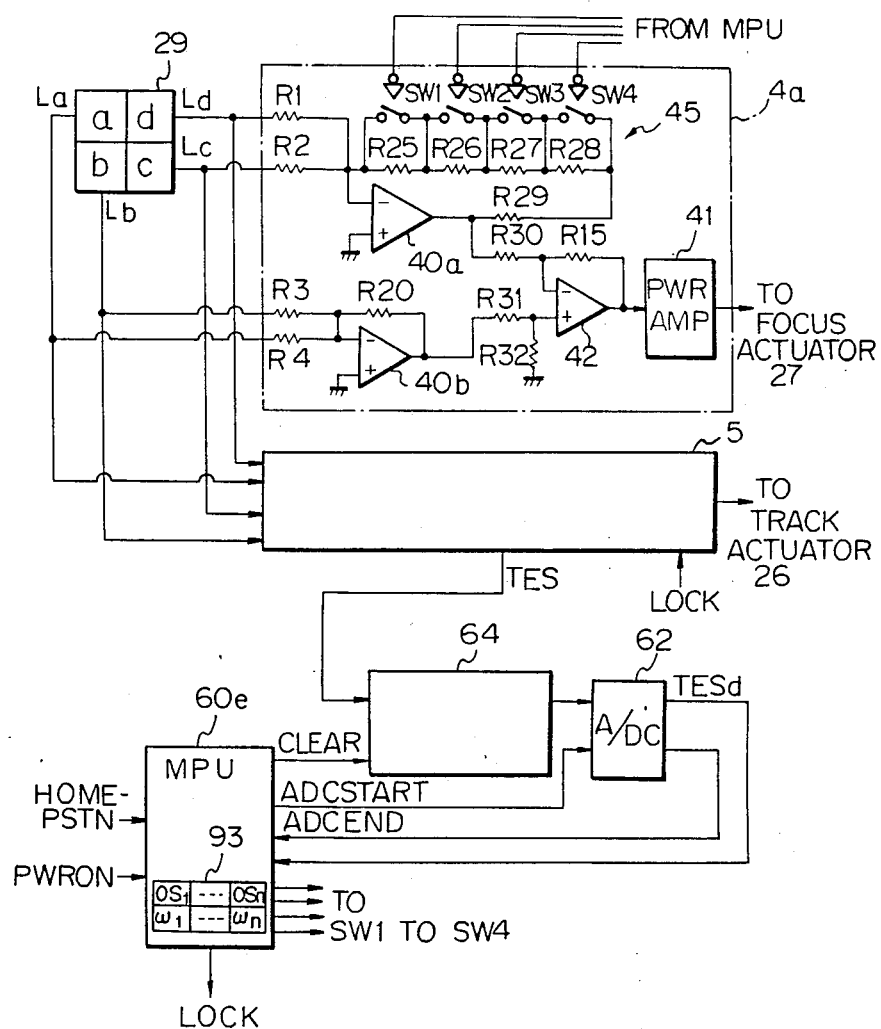
FIG. 21 is a schematic circuit diagram of a focus servomechanism control system of a further embodiment in accordance with the present invention.

A focus servomechanism control system in FIG. 21 is combined with the focus servomechanism control system shown in FIG. 18 and the focus servomechanism control system shown in FIG. 12. Accordingly, a description of the operation of the focus servomechanism control system in FIG. 21 is omitted.

Many widely different embodiments of the present invention may be constructed without departing from the spirit and scope of the present invention. It should be understood that the present invention is not limited to the specific embodiments described in this specification, except as defined in the appended claims.

What is claimed is:

1. A focus servomechanism control system in an optical disc system including a rotatable optical disc having at least one track storing data therein, a unit for focusing light for data write and read relative to said track and a unit for sensing light reflected from said track, for controlling said light focusing unit to adjust a focus of said light on said track, comprising:

(a) first means, operatively connected to said light focusing unit, for moving said light focusing unit in a direction perpendicular to a plane of said optical disc;

(b) second means, operatively connected to said light sensing unit, for producing a focus error signal;

(c) third means, operatively connected to said light sensing unit, for producing a track error signal;

(d) fourth means, operatively connected to said second means, for receiving an offset parameter and controlling a position of said light focusing unit through said first means in response to said focus error signal and said offset parameter; and (e) fifth means, operatively connected to said third and fourth means, during an offset adjustment mode, for continuously setting a plurality of offset parameters to said fourth means, to determine a maximum amplitude of said track error signal, and to set the offset parameter producing said maximum amplitude of said track error signal to said fourth means.

2. A focus servomechanism control system according to claim 1, wherein said fifth means comprises:

(i) a processor;

(ii) a largest amplitude detection circuit, operatively connected between said third means and said processor, for detecting a largest amplitude of said track error signal and for sending said largest amplitude to said processor; and (iii) an offset outputting circuit, operatively connected between said fourth means and said processor, for outputting the offset parameter from said processor to said fourth means, wherein said processor continuously outputs said plurality of said offset parameters, receives said largest amplitude from said largest amplitude detection circuit for each offset parameter, determines a maximum amplitude from among said received largest amplitudes, and sets the offset parameter producing said maximum amplitude.

3. A focus servomechanism control system according to claim 2, wherein said largest amplitude detection circuit comprises:

(1) a sample holder, and (2) an analog-to-digital (A/D) converter connected thereto, wherein said processor outputs a sample hold signal to said sample holder in a period shorter than a frequency of said tracking error signal to hold said tracking error signal for a time sufficient for A/D conversion in said sample holder, said A/D converter operating in response to said sample hold signal.

4. A focus servomechanism control system according to claim 3, wherein said offset outputting circuit comprises a digital-to-analog (D/A) converter outputting an analog signal corresponding to the offset parameter.

5. A focus servomechanism control system according to claim 3, wherein said offset outputting circuit comprises a plurality of resistors and a plurality of switches selectively shorting said resistors to change a total resistance of said resistors, wherein said processor selectively energizes said switches in response to the offset parameter and wherein said offset outputting circuit substantially changes a signal used for controlling the position of said light focusing unit in response to said offset parameter and said focus error signal.

6. A focus servomechanism control system according to claim 2, wherein said largest amplitude detection circuit comprises a peak holder and an analog-to-digital (A/D) converter connected thereto, and wherein said processor energizes said A/D converter before an output of a next offset parameter, receives an A/D converted value in response to completion of an A/D conversion, and resets said peak holder.

7. A focus servomechanism control system according to claim 6, wherein said offset outputting circuit comprises a digital-to-analog (D/A) converter outputting an analog signal corresponding to the offset parameter.

8. A focus servomechanism control system according to claim 6, wherein said offset outputting circuit comprises a plurality of resistors and a plurality of switches selectively shorting said resistors to change a total resistance of said resistors, wherein said processor selectively energizes said switches in response to the offset parameter, and wherein said offset outputting circuit substantially changes a signal used for controlling the position of said light focus unit in response to said offset parameter and said focus error signal.

9. A focus servomechanism control system according to claim 2, wherein said largest amplitude detection circuit comprises:

(1) an envelope detection-type amplitude detection circuit;

(2) an integrator integrating said detected signal at said largest amplitude detection circuit; and (3) an analog-to-digital (A/D) converter connected to said integrator, and wherein said processor energizes said A/D converter before an output of a next offset parameter, receives an A/D converted value in response to completion of an A/D conversion, and resets said integrator.

10. A focus servomechanism control system according to claim 9, wherein said offset outputting circuit comprises a digital-to-analog (D/A) converter outputting an analog signal corresponding to the offset parameter.

11. A focus servomechanism control system according to claim 9, wherein said offset outputting circuit comprises a plurality of resistors and a plurality of switches selectively shorting said resistors to change a total resistance of said resistors, wherein said processor selectively energizes said switches in response to the offset parameter, and wherein said offset outputting circuit substantially changes a signal used for controlling the position of said light focus unit in response to said offset parameter and said focus error signal.

12. A focus servomechanism control system according to claim 1, wherein said offset setting means continuously sets said plurality of offset parameters in response to each rotation of said optical disc.

* * * * *

UNITED STATES PATENT AND TRADEMARK OFFICE
CERTIFICATE OF CORRECTION

PATENT NO. : 4,707,648

DATED : Nov. 17, 1987

INVENTOR(S) : MINAMI

It is certified that error appears in the above-identified patent and that said Letters Patent is hereby corrected as shown below:

On the title page

[57] ABSTRACT
Line 19, delete "effects".

Col. 3
Line 43, after "are" insert --graphs and--;
Line 46, delete "views" and insert --graphs--.

Col. 4
Line 4, after "peak" insert --detector--.

Signed and Sealed this

Twelfth Day of April, 1988

Attest:

DONALD J. QUIGG

Attesting Officer

Commissioner of Patents and Trademarks